United States Patent [19]

Memon et al.

[11] 4,391,938

[45] Jul. 5, 1983

[54] POLYETHYLENE TEREPHTHALATE COMPOSITIONS HAVING IMPROVED CRYSTALLIZATION RATE AND SURFACE APPEARANCE

[75] Inventors: Nazir A. Memon, Fallsington; Cielo S. Myers, Holland, both of Pa.

[73] Assignee: Rohm and Haas Company, Philadelphia, Pa.

[21] Appl. No.: 349,215

[22] Filed: Feb. 16, 1982

[51] Int. Cl.$^3$ .................. C08K 3/40; C08K 5/11; C08G 63/70

[52] U.S. Cl. .................... 524/270; 524/114; 524/271; 524/284; 524/311; 524/317; 524/339; 524/425; 524/442; 524/539; 524/601; 524/605; 525/437; 525/439

[58] Field of Search ............... 524/114, 270, 271, 284, 524/311, 317, 339, 425, 442, 539, 601, 605; 525/439, 437

[56] References Cited

U.S. PATENT DOCUMENTS

| | | | |
|---|---|---|---|
| 3,241,992 | 3/1966 | Miksch et al. | 524/311 |
| 4,098,845 | 7/1978 | Keck | 525/437 |
| 4,131,595 | 12/1978 | Breitenfellner et al. | 524/539 |
| 4,163,100 | 7/1979 | Bier et al. | 524/539 |
| 4,207,230 | 6/1980 | Bier et al. | 524/539 |
| 4,212,791 | 7/1980 | Avery et al. | 524/314 |
| 4,215,032 | 7/1980 | Kabayashi et al. | 524/539 |
| 4,223,113 | 9/1980 | Bier et al. | 525/439 |
| 4,239,677 | 12/1980 | Dieck | 524/605 |
| 4,305,864 | 12/1981 | Griffin et al. | 525/437 |
| 4,336,343 | 6/1982 | Aharoni | 525/439 |
| 4,344,874 | 8/1982 | Akagi et al. | 524/605 |
| 4,351,751 | 9/1982 | Kishida et al. | 524/605 |
| 4,362,839 | 12/1982 | Tonoki et al. | 525/437 |

FOREIGN PATENT DOCUMENTS 2015013A 9/1979 United Kingdom .
2015014A 9/1979 United Kingdom .

*Primary Examiner*—H. S. Cockeram
*Attorney, Agent, or Firm*—Jordan J. Driks

[57] ABSTRACT

Compositions comprising polyethylene terephthalate and an additive to promote crystallization rate and improve surface appearance selected from the group consisting of monomeric esters of citric acid and epoxidized esters of unsaturated aliphatic carboxylic acids. Compositions comprising polyethylene terephthalate, poly ($C_4$-$C_6$) terephthalate, and a surface appearance and crystallization rate improving additive selected from the group consisting of monomeric esters of citric acid, organic esters of an aromatic carboxylic acid of 7 to 11 carbon atoms containing at least one carboxyl group per aromatic nucleus and an alcohol, oligomeric polyesters, and epoxidized esters of unsaturated aliphatic carboxylic acids.

11 Claims, No Drawings

POLYETHYLENE TEREPHTHALATE COMPOSITIONS HAVING IMPROVED CRYSTALLIZATION RATE AND SURFACE APPEARANCE

BACKGROUND OF THE INVENTION

1. Field Of The Invention

This invention relates to improved polyethylene terephthalate compositions useful for molding resins and classified as engineering plastics.

2. Description Of The Prior Art

Japanese patent applications Nos. 71-32867 entitled A Method Of Injection Molding Polyethylene Terephthalate and 73-31247 entitled Polyethylene Terephthalate Blends With Improved Elongation And Impact Strength and General Electric U.S. Pat. No. 3,953,994 entitled Polyester Alloys And Molding Compositions Containing The Same show PET compositions containing minor amounts of polybutylene terephthalate (PBT).

Avery et al. U.S. Pat. No. 4,212,791 entitled Polyalkylene Terephthalate Molding Compositions Containing Oligomeric Polyesters And Segmented Copolyester-Polyether Elastomers teaches away from the replacement of the segmented elastomers with PBT because of detriment to surface appearance.

U.K. Pat. Nos. 2015014A and 2015013A to DuPont show alkali metal salt of organic acids and low molecular weight organic esters of aromatic carboxylic acid to improve surface appearance of PET.

Bayer U.S. Pat. No. 4,223,113 teaches oligomeric polyester plasticizers in polyalkylene terephthalate compositions for improvement in crystallization behavior.

SUMMARY OF THE INVENTION

Although the prior art had provided PET compositions having good crystallization behavior, surface appearance and physical properties by the use of oligomeric polyesters and segmented polyester-ether elastomers in combination, such segmented elastomers are not readily available, or, if available, are relatively high priced. Furthermore, there are certain disadvantages to such segmented elastomers. Therefore, it is an object of the present invention to provide PET compositions useful in molding as engineering plastics which have a very rapid rate of crystallization and yet provide excellent surface appearance and other physical properties. It is a further object of the invention to provide such compositions without the use of segmented polyester-ether elastomers. A still further object is to improve, in some cases, on the use of oligomeric polyester plasticizers as crystallization promoters.

These objects and other as will become apparent from the following description are achieved by the present invention which comprises in one aspect compositions comprising polyethylene terephthalate and an additive to promote crystallization rate and improve surface appearance selected from the group consisting of monomeric esters of citric acid and epoxidized esters of unsaturated aliphatic carboxylic acid. Another aspect of the invention comprises polyethylene terephthalate, poly ($C_4$-$C_6$) terephthalate, modifier and a surface appearance and crystallization rate improving additive selected from the group consisting of monomeric esters of citric acid, organic esters of an aromatic carboxylic acid of 7 to 11 carbon atoms containing at least one carboxyl group per aromatic nucleus and an alcohol, oligomeric polyesters, and epoxidized esters of unsaturated aliphatic carboxylic acids.

DETAILED DESCRIPTION OF THE INVENTION AND THE PREFERRED EMBODIMENTS

The polyethylene terephthalate resin used as the starting compounds should preferably have an intrinsic viscosity range of 0.4 to 1.4 grams per deciliter, and more preferably between about 0.6 and 0.8 grams per deciliter. For these purposes, the intrinsic viscosity is measured before extrusion in a 1% solution of phenol and tetrachloroethane, 60:40 at 25° C.

The reinforcing fillers contemplated in this invention are glass fiber, mica, Wollastonite, graphite and any combination of the above. In general, compositions will contain from about 10 to 60 percent of the reinforcing filler.

The inert particulate nucleating agent can be talc, Kaolin, calcium carbonate, aluminum oxide, graphite, and the like. Amounts of nucleating agents to be used to include 0.05-5%. The nucleating agent can be a mixture of two or more inert particulate materials of which graphite is one.

Preferred polyalkylene ($C_4$-$C_6$) terephthalate modifiers will consist of high molecular weight polymeric terephthalates of 1,4-butylene glycol and 1,6-hexane diol. Also contemplated are mixtures of such polyesters and copolymers derived from 1,4-butanediol and 1,6 hexanediol.

Especially preferred polyalkylene ($C_4$-$C_6$) terephthalate modifiers will have an intrinsic viscosity in the range of 0.5 to 1.3. In general, compositions containing a weight ratio of polyalkylene ($C_4$-$C_6$) terephthalate modifier to polyalkylene ($C_4$-$C_6$) terephthalate and polyalkylene terephthalate of 0.05-0.50 provide the best overall combination of properties and are, therefore, preferred.

Several classes of compounds which act as plasticizers are useful in this invention. One such group is the oligomeric polyesters which have been disclosed in U.S. Pat. No. 4,212,791 and are included by reference. Another class of plasticizers are organic esters of an aromatic carboxylic acid of 7-11 carbon atoms containing at least one carboxyl group per aromatic nucleus, and an alcohol selected from those of the formula (OH $CH_2$)$_x$R' where x=1, 2 or 3 and R' is a hydrocarbon radical of 2-10 carbon atoms or those of the formula HO($R''$-O)$_y$—R''' wherein Y is between 2 and 8 and R'' is a hydrocarbon radical of 2-8 carbon atoms and R''' is —H or a hydrocarbon radical of 2-12 carbon atoms.

Other classes of plasticizers useful in this invention are:

(i) Plasticizers made up of epoxidized esters of unsaturated aliphatic carboxylic acids. Preferred esters are those from carboxylic acids containing 12-22 carbon atoms, 1-3 double bonds, and 1 carboxyl group with aliphatic alcohols containing 1-20 carbon atoms and 1-3 hydroxyl groups; preferably, all carboxyl and all hydroxyl groups are esterified and all double bonds epoxidized. Examples include epoxidized linseed oil, epoxidized soybean oil, epoxidized octyl tallate, and epoxidized propylene dioleate.

(ii) Plasticizers made up of esters of citric acid with aliphatic alcohols preferably containing 1-20 carbon atoms and where the hydroxyl group is preferably esterified with an aliphatic carboxylic acid with 1–20 carbon atoms. Examples are: acetylated butyl citrate, acetylated octyl, decyl citrate. These plasticizers can be used alone or in combination. The total amount of plasticizers which can be used in the compositions are 1 to 10%.

Other additives are optionally present in the compositions of the invention. Mineral fillers, flame retardants, colorants, stabilizers, mold release agents, and impact modifiers can be included.

EXAMPLES

Measurements of crystallization rates, and crystallization temperature were performed by differential thermal analysis (DTA). Crystallization rates were determined isothermally at 90° or 100° C. on quenched samples of molten PET. The rate of crystallization is expressed as crystallization half-time, $t_{\frac{1}{2}}$, which is the time necessary for 50% of the polymer to crystallize.

The crystallization temperature (Tc) was determined as the temperature where a peak maximum occurred during heating cycle at a 10° or 20° C./minute heating rate of an injection molded specimen (30 mil). Smaller numbers indicate greater efficiency of the additives for improving crystallization behavior.

The surface appearance of the injection molded specimens was determined by measuring the 60° gloss on a 2"×3"×0.100" plaque. The plaque was molded on a Newbury 1.5 oz. reciprocating screw injection molding machine. The mold cavity was edge gated with a 0.1"×0.2" gate. The 60° gloss was measured on the four corners and center of both sides of the plaque and averaged to give the recorded values.

EXAMPLE 1

Polyethylene terephthalate (70 parts), with an intrinsic viscosity of 0.62 g/dl as measured in a 1% solution of 3:2 phenol:tetrachloroethane at 25° C., and 30 parts of 3/16" chopped glass fiber were dried under vacuum for 12 hours. The materials were mixed together and extruded in a 1" single screw extruder equipped with one vacuum vent and a nitrogen blanketed feed. The extrudate was pelletized and dried again under vacuum for 5 hours at 120° C. The material was molded on a Newbury 1.5 oz. reciprocating screw injection molding machine at 275° C. melt temperature, a 95°–100° C. mold surface temperature, and a 40 second cycle time. The properties are presented in Table I.

EXAMPLES 2–6

Examples 2–6 were compounded and molded in the same fashion as Example 1 except that PBT, oligomeric polyester plasticizer polydiethylene, glycol/neopentyl glycol trimethylol ethane adipate, and a core shell impact modifier consisting of a crosslinked polybutyl acrylate core on which was grafted polymethyl methacrylate, was substituted for some of the polyethylene terephthalate. All samples contained 30 parts glass fiber and 0.2 to 0.6 parts talc. The amounts of the additives in the compositions and the surface appearance, crystallization behavior, and tensile data are summarized in Table I.

The fact that we were able to successfully mold this composition and achieve good properties, especially good gloss, is surprising in view of the teachings of Avery et al, cited supra, who found this composition to be undesirable.

The data in Table I demonstrate that including both a polybutylene terephthalate resin and a plasticizer in a PET composition results in good surface appearance, improved impact, and improved rate of crystallization. Thus, Example 1, 30% glass fiber reinforced PET, shows low gloss, low notched Izod impact strength, and a very slow crystallization. Examples 2 and 3 show both the plasticizer and PBT improve gloss to some degree, but do not improve impact strength, and crystallization rate is still very slow. Example 4 shows that high levels of plasticizer decrease the tensile strength of the composition and as such there is an upper limit to the level of plasticizer that can be used. Example 5 shows that the use of a combination of PBT and plasticizer provide compositions having significantly higher gloss and impact without affecting tensile properties. Example 6 shows another combination, PBT and plasticizer, useful in the compositions.

EXAMPLES 7–10

Examples 7–10 were prepared according to Example 1 with 30 parts 3/16" chopped glass fiber, 9 parts core-shell impact modifier, 0–5 parts of talc and 7.9 parts of PBT with a combination of two plasticizers selected from Table II. The data recorded in Table VI demonstrates that a combination of plasticizers in combination with PBT will act to enhance surface appearance of PET compositions.

EXAMPLES 11–16

Examples 11–16 were prepared according to Example 1 with 30 parts 3/16" chopped glass fiber and 0.5 parts of talc. Other components are listed in Table IV. The plasticizers used in these samples are presented in Table II. The data show that different plasticizers in combination with PBT are effective in this invention to improve surface appearance and crystallization temperature, Tc.

EXAMPLES 17–30

Examples 17 through 30 were prepared according to Example 1 with 30 parts 3/16" chopped glass fiber, 0.4 parts talc and 0.6 parts antioxidant and stabilizers. Other components are listed in Table V. The effects on surface appearance, crystallization behavior and tensile data are also provided in Table V. The data indicate that both PBT and plasticizers have some beneficial effect on surface appearance and crystallization behavior of PET molding compositions (Examples 17 through 26). Examples 27 through 30 demonstrate the synergistic interaction between PBT and plasticizers providing a superior improvement in surface appearance and crystallization behavior.

EXAMPLES 31–36

Following the procedure of Example 1, but including 14% flame retardant, it was demonstrated that the addition of PBT and epoxidized esters of tall oil fatty acids and 2-ethyl hexanol synergistically improved PET. The results are shown in Table VI.

TABLE I

| Ex. No. | Parts PBT | Parts Oligomeric Polyester Plasticizer | Parts Core-Shell Modifier | Notch Izod (ft lbs/in) | 60° Gloss (% Reflectance) | t₁ at 90° C. (seconds) | Tensile Stress (psi) |
|---|---|---|---|---|---|---|---|
| 1 | 0 | 0 | 9 | 1.6 | 15 | No peak | 21,000 |
| 2 | 0 | 4 | 9 | 1.6 | 43 | >1000 | 20,000 |
| 3 | 10 | 0 | 9 | 1.6 | 34 | >1000 | 19,000 |
| 4 | 7.5 | 6 | 9 | 2.2 | 77 | 350 | 15,700 |
| 5 | 9 | 4.25 | 9 | 2.3 | 76 | 400 | 19,800 |
| 6 | 15 | 4 | 9 | 2.0 | 76 | 550 | 20,000 |

TABLE II

| | |
|---|---|
| I | Poly(diethylene glycol/neopentyl glycol(2:1) trimethylol ethane adipate) |
| II | Epoxidzed soybean oil |
| III | Epoxidized ester of tall oil fatty acid and 2-ethyl hexanol |
| IV | Acetylated butyl citrate |
| V | Acetylated Octyl decyl citrate |
| VI | Neopentyl glycol dibenzoate |
| VII | Triethylene glycol dibenzoate |

TABLE III

| Ex. No. | Parts PBT | Parts[1] Oligomeric Polyester Plasticizer | Parts Core-Shell Modifier | Notch Izod (ft lbs/in) | 60° Gloss (% Reflectance) | t₁ at 90° C. (seconds) | Tensile Stress (psi) |
|---|---|---|---|---|---|---|---|
| 7 | 7.9 | 1.1 of I and 1.1 of VII | 9.0 | 1.8 | 40 | 1000 | 17,400 |
| 8 | 7.9 | 3.9 of I and 1.1 of VII | 9.0 | 1.9 | 82 | 300 | 17,900 |
| 9 | 7.9 | 1.1 of I and 3.9 of VII | 9.0 | 1.8 | 73 | 195 | 17,200 |
| 10 | 7.9 | 3.9 of I and 3.9 of VII | 9.0 | 1.9 | 86 | 90 | 16,600 |

[1]The Roman numerals indicate the plasticizer used (see Table II)

TABLE IV

| Ex. No. | Parts PBT | Parts of Plasticizer Used[1] | Parts Core-Shell Modifier | 60° Gloss (% Reflectance) | Tc °C. |
|---|---|---|---|---|---|
| 11 | 0 | 0 | 9 | 15 | 134 |
| 12 | 9.4 | 2.15 (I) | 1 | 36 | 108 |
| 13 | 9.4 | 2.15 (II) | 1 | 37 | 114 |
| 14 | 9.4 | 2.15 (III) | 1 | 35 | 112 |
| 15 | 9.4 | 2.15 (IV) | 1 | 45 | 112 |
| 16 | 9.4 | 2.15 (V) | 1 | 43 | 109 |

[1]The Roman numerals indicate the plasticizer used (see Table II)

TABLE V

| Ex. No. | Parts PBT | Parts Plasticizer[1] | Parts Core-Shell Modifier | t₁ (seconds) | Tc °C. | 60° Gloss (% Reflectance) | Tensile Strength (psi) |
|---|---|---|---|---|---|---|---|
| 17 | 0 | 0 | 1.0 | >1000 | 123 | 38 | 20,000 |
| 19 | 14.1 | 0 | 1.0 | 345 | 118 | 47 | 19,800 |
| 20 | 17.5 | 0 | 1.0 | 245 | 115 | 62 | 19,900 |
| 21 | 0 | 2.2 (III) | 1.0 | >1000 | 122 | 52 | 19,400 |
| 22 | 0 | 3.4 (III) | 1.0 | 575 | 119 | 49 | 19,500 |
| 23 | 0 | 4.3 (III) | 1.0 | 495 | 117 | 57 | 18,300 |
| 24 | 0 | 2.2 (IV) | 1.0 | 500 | 118 | 34 | 20,000 |
| 25 | 0 | 3.4 (IV) | 1.0 | 315 | 117 | 32 | 20,800 |
| 26 | 0 | 4.3 (IV) | 1.0 | 295 | 117 | 27 | 20,000 |
| 27 | 9.4 | 4.3 (IV) | 1.0 | 115 | 112 | 51 | 19,600 |
| 28 | 14.1 | 3.4 (III) | 1.0 | 120 | 109 | 65 | 18,400 |
| 29 | 14.1 | 3.4 (III) | 9.0 | 77 | 104 | 61 | 16,400 |
| 30 | 17.5 | 2.2 (IV) | 1.0 | 110 | 106 | 58 | 19,600 |

[1]The Roman numerals indicate the plasticizer used (see Table II)

TABLE VI

| Examples | Flame Retardant, % | PBT, % | Plasticizer, % | Core-Shell Modifier, % | t₁ at 100° C., sec. | Tc, °C. |
|---|---|---|---|---|---|---|
| 31 | 14 | 10.7 | 0 | 1.0 | 360 | 110 |
| 32 | 14 | 0 | 2.5 (II) | 1.0 | >1000 | 116 |
| 33 | 14 | 10.2 | 2.5 (II) | 1.0 | 215 | 109 |
| 34 | 14 | 10.2 | 2.5 (III) | 1.0 | 150 | 105 |
| 35 | 14 | 12.5 | 3.4 (II) | 1.0 | 95 | — |
| 36 | 14 | 12.5 | 3.4 (III) | 1.0 | 80 | 99 |

We claim:

1. Composition comprising polyethylene terephthalate and from about 1 to about 10% by weight of an additive, based on polyethylene terephthalate and additive, said additive being present to promote crystallization rate and improve surface appearance, said additive being selected from the group consisting of monomeric esters of citric acid and epoxidized esters of unsaturated aliphatic carboxylic acids.

2. Composition of claim 1 wherein said additive is epoxidized tall oil esters.

3. Composition of claim 1 wherein said additive is acetylated butyl citrate or acetylated octyl, decyl citrate or mixtures thereof.

4. Composition comprising polyethylene terephthalate, poly ($C_4$-$C_6$) terephthalate, and a surface appearance and crystallization rate improving additive in an amount of from about 1 to about 15% of said additive based on polyethylene terephthalate, poly ($C_4$-$C_6$) terephthalate, and additive, said additive being selected from the group consisting of monomeric esters of citric acid, organic esters of an aromatic carboxylic acid of 7 to 11 carbon atoms containing at least one carboxyl group per aromatic nucleus and an alcohol, oligomeric polyesters, and epoxidized esters of unsaturated aliphatic carboxylic acids.

5. Composition of claim 4 wherein the weight ratio of poly($C_4$-$C_6$) terephthalate to poly ($C_4$-$C_6$) terephthalate and polyethylene terephthalate is about 0.05 to 0.50.

6. Composition of claim 4 wherein said additive is epoxidized tall oil esters.

7. Composition of claim 4 wherein said additive is acetylated butyl citrate or acetylated octyl, decyl citrate.

8. Composition of claim 4 wherein said additive is epoxidized tall oil esters and the weight ratio of poly ($C_4$-$C_6$) terephthalate to poly ($C_4$-$C_6$) terephthalate and polyethylene terephthalate is about 0.05 to 0.50.

9. Composition of claim 4 further including flame retardant.

10. Composition of claim 4 further including glass reinforcement.

11. Composition of claim 4 further including reinforcing filler material selected from mica, wollastonite, and reprecipitated calcium carbonate.

* * * * *